United States Patent
Kishida et al.

(10) Patent No.: US 8,116,768 B2
(45) Date of Patent: *Feb. 14, 2012

(54) AUTOMATIC SELECTION OF A BACKGROUND IMAGE FOR A DISPLAY ON A MOBILE TELEPHONE

(75) Inventors: Mitsuya Kishida, Munich (DE); Yuji Seo, Munich (DE); Jari Maenpaa, Poing (DE)

(73) Assignee: Sony Deutschland GmbH, Koeln (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/489,541

(22) Filed: Jun. 23, 2009

(65) Prior Publication Data

US 2009/0258681 A1    Oct. 15, 2009

Related U.S. Application Data

(63) Continuation of application No. 09/977,887, filed on Oct. 15, 2001.

(30) Foreign Application Priority Data

Oct. 16, 2000    (EP) .................................. 00122561

(51) Int. Cl.
*H04W 4/00* (2009.01)
*H04B 1/38* (2006.01)
*H04M 1/725* (2006.01)

(52) U.S. Cl. .................. 455/435.1; 455/566; 455/412.1

(58) Field of Classification Search .................. 455/566, 455/435.1, 412.1–412.2, 558, 556; 345/589, 345/636, 522; 379/93.17, 433.04; 370/395.2

See application file for complete search history.

(56) References Cited

U.S. PATENT DOCUMENTS

| | | | |
|---|---|---|---|
| 5,802,468 A * | 9/1998 | Gallant et al. | 455/422.1 |
| 5,862,471 A | 1/1999 | Tiedemann et al. | |
| 5,870,683 A | 2/1999 | Wells et al. | |
| 5,950,130 A | 9/1999 | Coursey | |
| 6,020,828 A | 2/2000 | Gotou | |
| 6,044,248 A | 3/2000 | Mochizuki et al. | |
| 6,311,180 B1 * | 10/2001 | Fogarty | 707/4 |
| 6,470,182 B1 | 10/2002 | Nelson | |
| 6,473,628 B1 | 10/2002 | Kuno et al. | |
| 6,505,256 B1 * | 1/2003 | York | 709/246 |
| 6,529,202 B2 * | 3/2003 | Wu | 345/593 |
| 6,628,971 B1 * | 9/2003 | Yoon et al. | 455/566 |
| 6,667,748 B1 * | 12/2003 | Hubbe et al. | 715/723 |
| 6,684,087 B1 * | 1/2004 | Yu et al. | 455/566 |
| 6,694,133 B1 | 2/2004 | Tobita et al. | |
| 6,792,450 B1 | 9/2004 | Wakatsuki | |
| 6,819,944 B1 | 11/2004 | Sato | |
| 6,832,105 B2 | 12/2004 | Okawa | |
| 2002/0177438 A1 | 11/2002 | Sakai et al. | |

FOREIGN PATENT DOCUMENTS

| | | |
|---|---|---|
| EP | 0 831 629 A2 | 3/1998 |
| EP | 0 896 491 A1 | 2/1999 |
| EP | 0 926 911 A2 | 6/1999 |
| EP | 1 011 248 A2 | 6/2000 |
| WO | WO 97/30556 | 8/1997 |
| WO | WO 99/37105 | 7/1999 |

* cited by examiner

*Primary Examiner* — George Eng
*Assistant Examiner* — Nam Huynh
(74) *Attorney, Agent, or Firm* — Oblon, Spivak, McClelland, Maier & Neustadt, L.L.P.

(57) ABSTRACT

A method for providing a background image on a display of a mobile telephone, whereby the data of one or more background images are stored in at least one memory accessible for the mobile telephone, comprises an automatic selection of a background image to be displayed, a retrieving of the data of the automatically selected background image from the memory, and a displaying of the retrieved background image on the display of the mobile telephone.

20 Claims, 6 Drawing Sheets

AUTOMATIC SELECTION OF A BACKGROUND IMAGE FOR A DISPLAY ON A MOBILE TELEPHONE

CROSS REFERENCE TO RELATED APPLICATIONS

This application is a Continuation of and is based upon and claims the benefit of priority under 35 U.S.C. §120 to U.S. Ser. No. 09/977,887, filed Oct. 15, 2001, the entire contents of which is incorporated herein by reference, and claims the benefit of priority under 35 U.S.C. §119 from European Patent Application No. 00 122 561.4, filed Oct. 16, 2000.

BACKGROUND OF THE INVENTION

Field of the Invention

The present invention relates generally to the display of a background image on a display of a mobile telephone, and in particular to an automatic selection of a background image to be displayed.

With the progress in miniaturisation of the mobile telephones, most of the space on the front surface is used up by the key pad and the display. The remaining space is commonly to small for a satisfactorily sized logo of a contract operator. Furthermore, a logo or advertisement printed on the surface of the mobile telephone might not be actual for the whole life cycle of the telephone.

A presentation of graphical images on the display of a mobile telephone is a common feature for most of the mobile phones currently available. The graphical information is either stored in the memory of the mobile telephone or in the memory of the Subscriber Identity Module (SIM). The latter is described in EP 0 896 491 A1 according to which the instruction set of the SIM includes a graphical command for the display of graphical elements on the mobile phone's display unit.

Furthermore, graphical representations in the form of icons are currently used on selected parts of the display, to inform the user of the status of this mobile equipment like for example the remaining battery capacity, ringing volume or an active alarm function. These icons have the advantage of conveying important information while occupying a minimum of space on the display but they are too small for a graphical feature with an advertising purpose. Increasing the size of these graphical elements on the other hand reduces the space available for the display of messages in an alphanumerical form.

In EP 1 011 248 A2 a method and an apparatus for displaying background images in mobile telephones is described, according to which a background image is downloaded from a data source and stored in a memory. A user then can select a background from the memory for having it presented on the display unit of his mobile telephone. To avoid that messages displayed on top of the background image are thereby rendered unrecognisable, the display of the background image is stopped upon detection of an urgent character message display condition. The background image chosen for display is manually selected by the user and its selection does not depend on any parameters or a state of the mobile telephone.

The object of the present invention is now to propose a method and an apparatus for displaying a background image on the display unit of a mobile telephone in a simple and flexible manner.

This object is achieved by a method for providing a background image for a display of a mobile telephone, whereby the data of one or more of the background images are stored in at least one memory accessible for said mobile telephone, comprising the steps of automatically selecting a background image to be displayed from said one or more background images, retrieving the data of said automatically selected background image from said memory and displaying said retrieved background image on the display of said mobile telephone.

The above object is further achieved by a mobile telephone for a wireless telecommunication system, comprising control means for providing a background image on a display of the mobile terminal, whereby the data of one or more of the background images are stored in at least one memory accessible for said mobile telephone, the control means comprising selecting means for automatically selecting a background image to be displayed, a retrieving means for retrieving the data of the automatically selected background image from the memory, and a driver means for displaying the retrieved background image on the display.

The proposed method allows to display an image of advertising character even on miniature sized mobile telephones, particularly it allows a variable customising by the contract operator, who is the party to the telephone contract of the subscriber, on a space of sufficient size. Further advantageously, a background image will reflect the current operating state of a mobile telephone such as i.e. special services used or the network to which the mobile telephone is currently registered.

Further advantages features are claimed in the respective subclaims.

Advantageously, the automatic selection of the background image can be performed according to pre-set parameters, allowing the control of the image selection in a predetermined way. Further advantageously, the selection of the background image is based on information read from the subscriber identification file from which e.g. the contract operator can be identified. In a further advantageously embodiment of the present invention the automatic selection of the background image is based on information received from a base station.

Advantageously, the background image is received from a base station upon the registering process. Alternatively, the background image data are advantageously read from a memory on the Subscriber Identity Module, from a memory of the mobile telephone unit or further advantageously, the background image date are read from an external memory connected to the mobile telephone.

Further, the background image data can advantageously be downloaded from a computer to the mobile telephone and/or from a source on the Internet by using the browser function of the mobile telephone.

For the display of a background image only, only those colors are used, which support the imagination of lying behind a foreground information displayed in one or more of the remaining colors with graphical displays with a color depth of four grey scales, e.g. advantageously the colors white (transparent), light grey and dark grey are used for a background image, while the black color is reserved for foreground information like e.g. messages in text or icon form.

A means according to the present invention can be implemented in the graphical user interface of the mobile telephone's controlling unit utilising the graphic capabilities of the displaying devices.

In the following description, the present invention is explained in more detail in relation to the enclosed drawings, in which.

In the drawings like elements are assigned like reference numeral.

Figure 1:
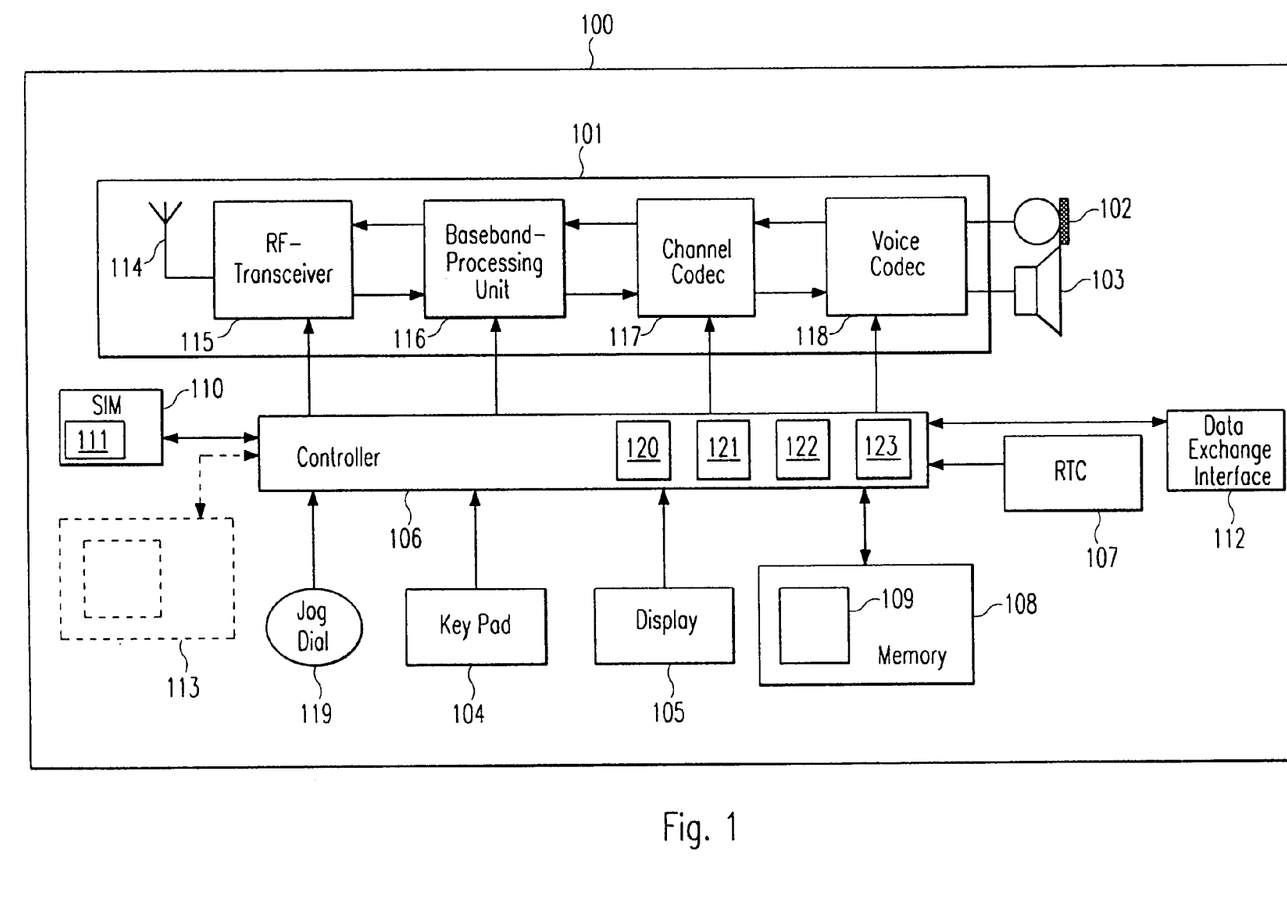
FIG. 1 shows schematically the functional blocks of a mobile telephone according to the present invention.

In FIG. 1 a block diagram of a mobile telephone 100 according to the present invention is shown which comprises means for the transmission of data and sound signals 101 with user interfaces for the reception 102 and generation 102 of sounds and for information exchange with the user by not sound based methods 104, 105. Further the mobile telephone comprises a controller unit 106 controlling the overall operation of the mobile equipment, a real time clock 107 for providing clock-pulses for the controller unit, a memory 108 containing a non-volatile section 109 for storing data which are not to be lost at conditions with no power applied to the electrical circuits of the telephone, and a Subscriber Identity Module (SIM) 110 with a memory section 111. A further data exchange interface 112 allows an exchange of data with other equipment like e.g. a personal computer or a laptop. Additionally an external memory 113 such as a Memory Stick (Trademark of SONY Corporation) or the like can be attached to the mobile equipment which will then also be controlled by the controller unit. The means for processing data or sound signals for or from the wireless transmission essentially consists of an aerial 114 connected to an RF-transceiving unit 115, a baseband processing unit 116, a channel coder/decoder 117 (codec), and a voice codec 118 with the microphone 102 and the speaker 103 of the telephone unit connected to it. Every of these single units is controlled by the controller unit. For information input from the user's side a jog dial 119 and a keypad 104 controlled by the controller unit are provided. A graphical user interface for presenting information of interest to the user is formed by an LCD-display 105. It is to be understood that the different functional blocks of the diagram represent functional units of the mobile phone and should not be misunderstood as singular electronic devices. The memory 108 e.g. can consist of a variety of memories of different kinds distributed over the circuit board of the mobile telephone.

Background images can be stored temporarily in the volatile section or permanently in the non-volatile section of a memory. Additionally or alternatively to storing a background image or a collection of background images in the memory of a mobile phone, it can as well be stored in a memory section 111 of the SIM 110 or will further be supplied in an external memory which can be connected to the mobile telephone and which is e.g. adapted for an exchange of data between different electronic devices.

Figure 2:
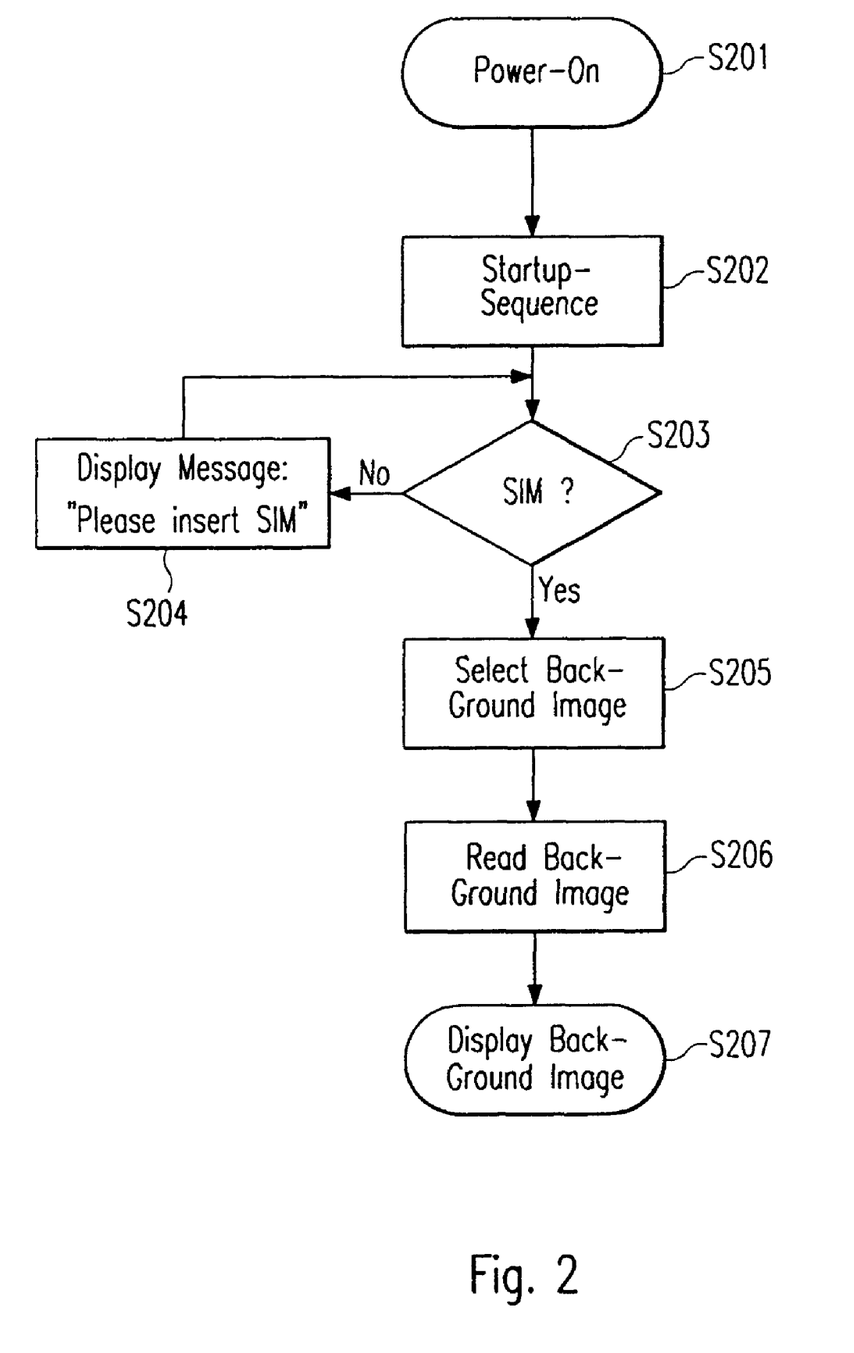
FIG. 2 is a flow chart illustrating the basic procedure for displaying a background image.

FIG. 2 shows the basic procedure for the selection and display of a background image on a display of a mobile telephone, whereby it is to be understood that only process steps relevant for the understanding of the present invention are shown in FIG. 2 and the following figures. After power-on S 201, the start up sequence S 202 ends in a check for the presence of the SIM module S 203, whereby a message S 204 asking the user to insert a SIM card is put on the display when the card can not be found. Is the SIM card found in place, a selecting means 120 background image and a retrieving means 121 reads S 206 the according data from a memory and finally the image according to this data is presented S 207 on the display of the mobile telephone by the driving means 123. The image can hereby be selected in various ways. Assuming that only one background image is stored in a memory, then the process of selecting the appropriate background image is reduced to selecting the only background image available. If a background image is to be chosen from a collection of several background images stored in a memory or distributed over several memories, then the selection is based on a set of parameter indicating the appropriate background image and the location in which the background image is stored. The parameters can be set in advance by the manufacturer of the phone or by the contract operator. Instead of storing the parameter set in the memory of the mobile phone, it can alternatively form a file in the memory on the SIM.

Figure 3:
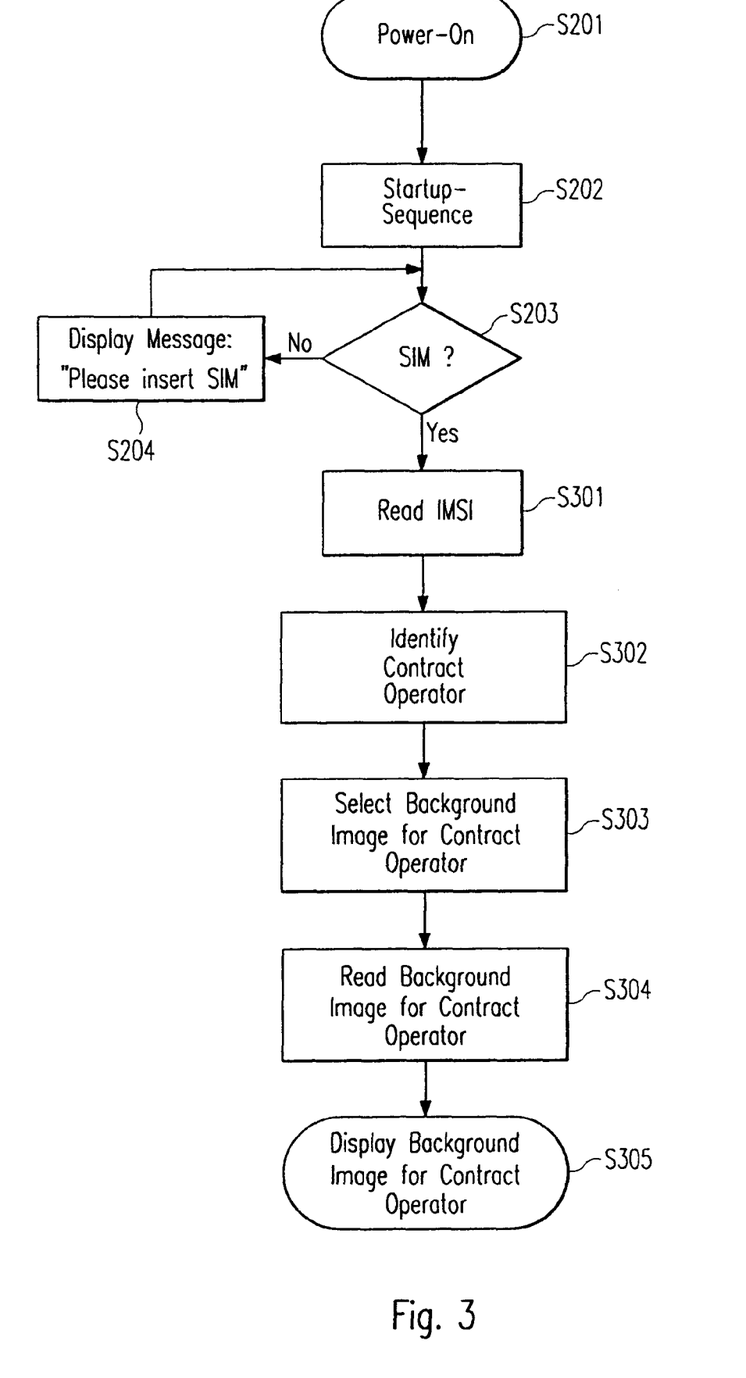
FIG. 3 is a flow chart showing the basic steps of an advanced procedure for displaying a background image selected on the basis of the IMSI value.

FIG. 3 shows an advanced procedure for providing a display of a background image, whereby the selection of this image is based on the contents of the IMSI file on the SIM card. After a user turned on the mobile phone S 201, a start up sequence S 202 initiates the elementary functions of the mobile phone and then checks the presence of the SIM card S 203. On a positive check result the International Mobile Subscriber Identification is read from the SIM followed by identifying S 302 the contract operator providing the SIM card from this file. Some of the background images collected in the memory of the mobile telephone are related to network operators and/or to companies selling mobile telephone contracts. With the identity of the contract operator known, a background image representing his identity is selected S 303 by the selecting means 120, read S 304 from the memory by the retrieving means and finally presented S 305 on the graphical display by the driver means 122. Alternatively the contract operator may store his background image in the memory of the SIM card. Further the background image or the selection of the background images can be stored in an external memory and read from there. If the background image related to the contract operator is not present in neither one of the described memories a substitute might be defined instead. According to the described procedure the selection process involves the assignment of an appropriate background image to the identity of the contract operator, checking for the location of the stored image, and if the image is not present in one of the accessible memories, assigning a substitute background image instead. Which background image will be chosen as a substitute and if any, is defined according to the pre-set parameters which can be set by the manufacturer of the mobile equipment or be placed in the form of a file on the SIM card by the contract operator and/or can be entered or modified manually by the user of the mobile phone.

Figure 4:
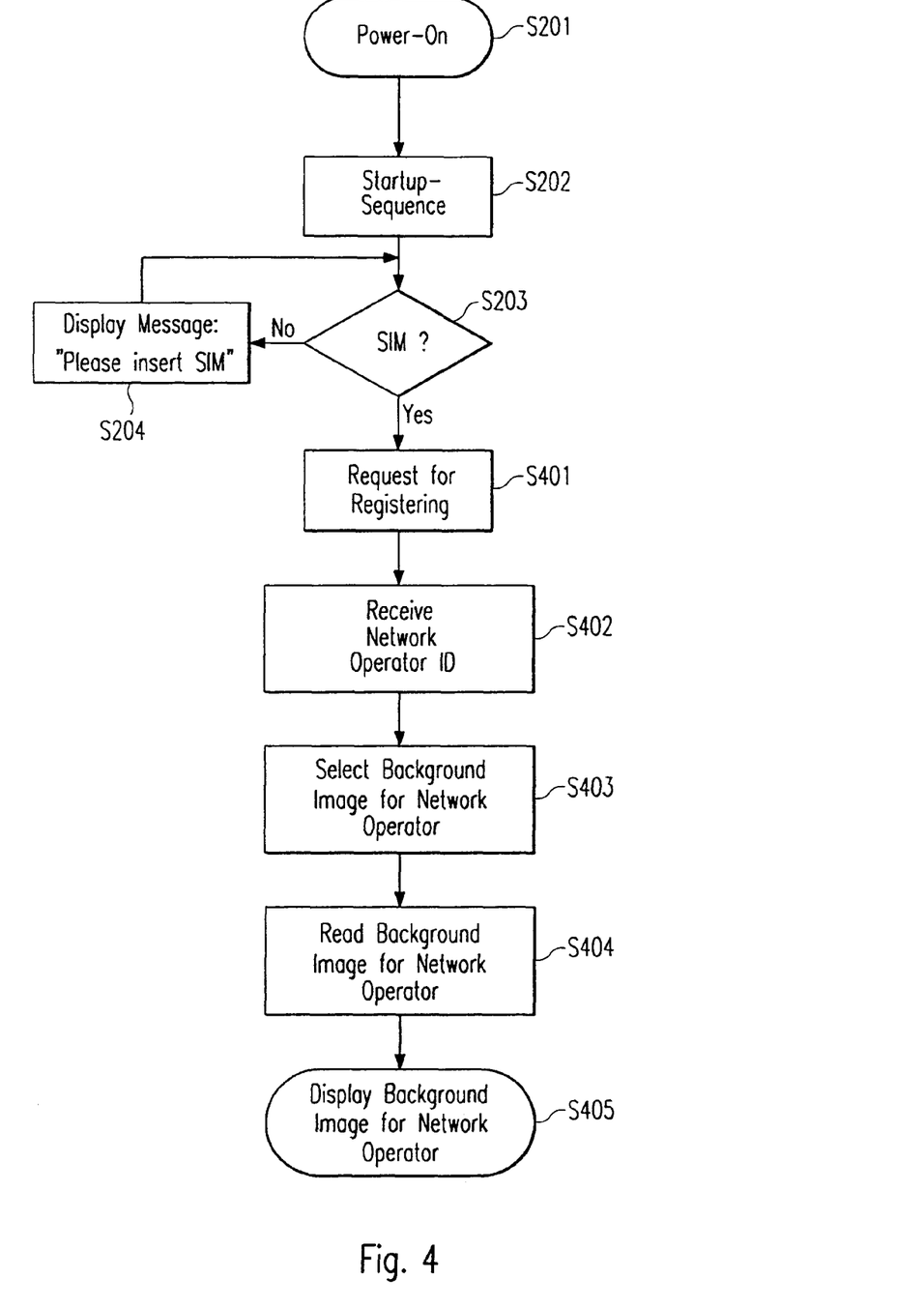
FIG. 4 is a flow chart illustrating the procedure for selecting a background image according to the operator of the mobile network in which the telephone is currently registered.
Figure 5:
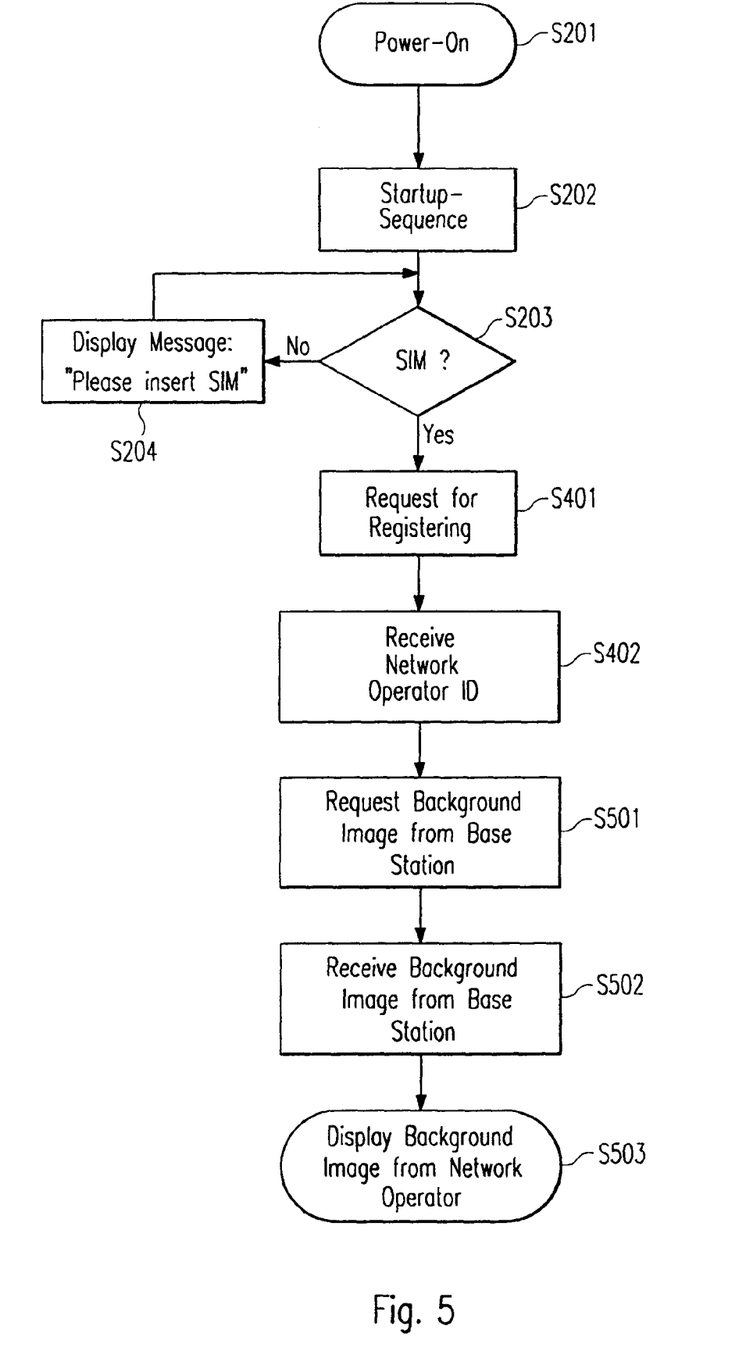
FIG. 5 is a flow chart illustrating the procedure for a requested background image transmitted from the base station to the mobile telephone.

A process for showing a background image related to the operator of the currently used mobile network is illustrated in FIG. 4. The initial steps are identical to those of the procedures described above. After the presence of the SIM card has been checked S 203 positively the telephone registers S 401 on the next base station. On condition of a successful registering, the base station sends an identification S 402 of the operator running the mobile network of which the base station is a part of. According to this identification a background image is selected S 403 from the collection of background images available to the mobile telephone by the selecting means 120, read from its location by the retrieving means 121 and presented S 405 on the display of the phone by the driving means 122. The selected background image 404 can either be related to the identity of the network operator or be a substitute if no such image is available. Alternatively to taking an image from one of the memory locations which can be accessed by the mobile phone, the image may be transmitted from a base station in the process of the registering procedure. This is shown in FIG. 5 illustrating that in consequence of the registering process S 401 the base station at first sends the identification S 402 of the network operator which initiates a request S 501 for a background image from the side of the mobile telephone triggered by the selecting means 120 which in turn will be satisfied by the transmission S 502 of the requested image by the base station. After reception S 502, the respective background image will either be stored in one of the described memories or send directly to the display for a graphical presentation S 503 by the driving means. Alternatively, the selecting means 120 requests for sending a background image only if a background image relating to the identity of the network operator could not be found in the collection of images in one of the memories.

Figure 6:
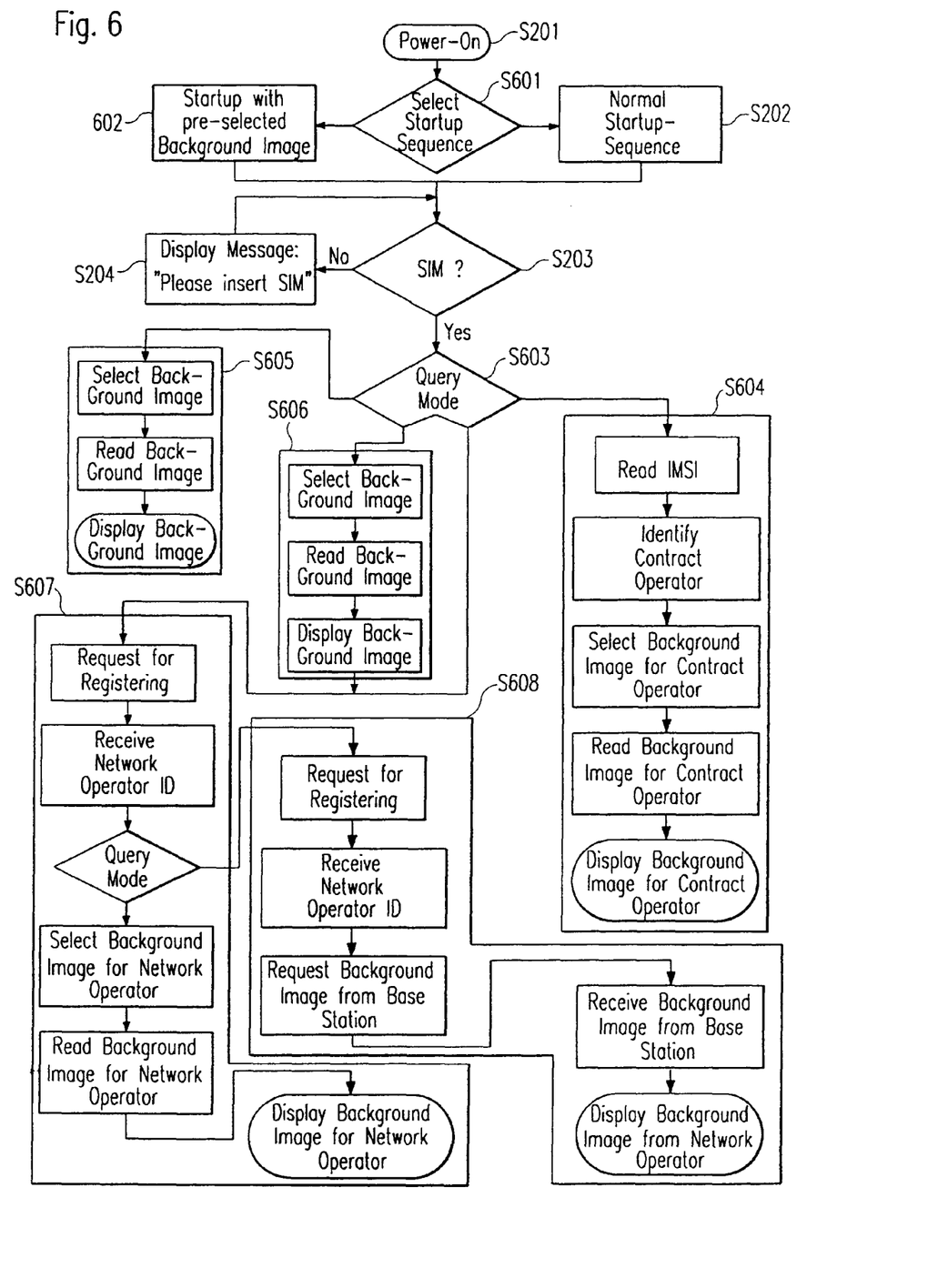
FIG. 6 is a flow chart illustrating the procedure for displaying a background image with the selection decision being dependent from pre-set parameters.

The procedure shown in FIG. 6 is a combination of the procedures described above. The decision criteria on the branch points are based on a predetermined set of parameters. This set can be determined by the manufacturer of the telephone either according to his own requirements or according to the requests of the contract operator. The parameter set is stored in a memory of the phone. Alternatively, the set of parameters can be stored in a file on the SIM card. Further, a user might be allowed to access the parameter set for modifying it according to his own convenience. After power-on S 201, the normal start-up sequence S 202 or, depending on the content of the parameter set, a different start-up sequence S 602 displaying a pre-defined background image runs, setting up the necessary functions of the telephone until the point when the presence of the SIM card is checked S 203. After a successful check of the SIM card one of the modes for displaying a background image described above is selected S 603 according to the content of the parameter set by the selecting means. Additionally, a condition for the selection will be the availability of appropriate background images. One of the selection possibilities is to display a background image related to the contract operator identified via the IMSI file located on the SIM card S 604. The according background image might be of an advertising character or just be a logo of the contract operator. The second selection possibility S 605 concerns the display of a certain background image or several background images in sequence as defined by the predetermined parameter set as long as the telephone is in a standby or in an idle mode but may continue for the phone being in an active state. According to the third possibility a background image related to the operator of the currently used mobile network is displayed S 607, whereby a background image related to the contract operator can be displayed as long as the network operator is not yet identified S 606. It will, based on the parameter set be decided, if after a positive identification of the network operator a background image is requested from the base station S 608 or a background image related to the network operator or a substitute therefore shall be taken from one of the memories accessible by the mobile telephone. In the case of receiving the image, the parameter set defines further if the image will be stored for further use in one of the memories or send directly to the display of the phone.

Background images can be transferred from the memory 108, 109 of the mobile phone and the memory 111 of the Subscriber Identity Module to the external memory 113 and vice a versa. This allows the exchange of background images between different electronic devices like e.g. other mobile telephones, computers or scanning equipment. This way the collection of background images can be modified by the user of the telephone. He can e.g. scan-in images of his own choice, transfer the data to the external memory and transfer it from there to the memory of the mobile telephone. Also the exchange of background images between two different mobile telephones can be managed via the external memory. Another possibility of modifying the collection of stored background images offers the data exchange interface of the mobile telephone, with the help of which images can be downloaded directly from a computer. Mobile phones offering a WAP (W@P) capability 123 allow the user to download background images from a website accessible via the Internet.

To make sure that the display of a background image does not interfere with messages which are simultaneously shown on the display in alphanumeric form like text or icons, the background images do not use all colors or grey scales available on the display. Especially colors with a high saturation are used for foreground information, while picture elements with colors of lighter shade including white respectively transparent form the elements of a background image. Preferably, on a display offering four grey scales for the presentation of alphanumerical and graphical information only the lighter grey tones are used for the background images. Whereby, the darkest color is used exclusively for the display of information in the form of icons or text and the remaining shades of grey are used to display the background image. This way, an optical distinction between the background and the foreground of the display is achieved.

The invention claimed is:

1. A method for providing a background image for a display of a mobile telephone, whereby the data of one or more of said background images are stored in at least one memory accessible for said mobile telephone, comprising the steps of:
   a) automatically selecting a background image to be displayed from said one or more background images based on a pre-set parameter that identifies said at least one memory accessible for said mobile phone at which said automatically selected background image is stored;
   b) retrieving the data of said automatically selected background image from said at least one memory identified by said pre-set parameter when said automatically selected background image is available from said at least one memory identified by said pre-set parameter, and retrieving data of a substitute background image defined based on the stored pre-set parameter when said automatically selected background image is not available from said at least one memory identified by said pre-set parameter; and
   c) displaying said retrieved background image on said display of said mobile telephone, wherein
   background image data are downloaded from a source on the Internet to the mobile telephone,
   said background image comprises colors available by the display except colors used for foreground information,
   colors of lighter shade including white respectively transparent form elements of the background image, and
   colors with a high saturation are used for the foreground information.

2. A method for providing a background image according to claim 1,
   wherein step a) comprises an automatic selection of said background image according to pre-set parameters.

3. A method for providing a background image according to claim 1, wherein step a) comprises an automatic selection of said background image based on information read from a subscriber identification file.

4. A method for providing a background image according to claim 1, wherein step a) comprises an automatic selection of said background image based on information received from a base station.

5. A method for providing a background image according to claim 1, wherein said background image data are downloaded from the Internet by a user of the mobile telephone.

6. A method for providing a background image according to claim 1, wherein step b) comprises reading said background image data from a memory on a Subscriber Identity Module.

7. A method for providing a background image according to claim 1, wherein step b) comprises reading said background image data from a memory of the mobile telephone unit.

8. A method for providing a background image according to claim 1, wherein step b) comprises reading said background image data from an external memory connected to said mobile telephone.

9. A method for providing a background image according to claim 1, wherein said background image data are downloaded from a website accessible via the Internet using a WAP capability of the mobile telephone.

10. A method for providing a background image according to claim 1, wherein said background image data are downloaded from said source on the Internet to the mobile telephone using a browser function of the mobile telephone.

11. A mobile telephone for a wireless telecommunication system, comprising control means for providing a background image on a display, whereby the data of one or more of said background images are stored in at least one memory accessible for said mobile telephone, said control means comprising:
selecting means for automatically selecting said background image to be displayed based on a pre-set parameter that identifies said at least one memory accessible for said mobile phone at which said automatically selected background image is stored;
retrieving means for retrieving the data of said automatically selected background image from said at least one memory identified by said pre-set parameter when said automatically selected background image is available from said at least one memory identified by said pre-set parameter, and retrieving data of a substitute background image defined based on the stored pre-set parameter when said automatically selected background image is not available from said at least one memory identified by said pre-set parameter;
driver means for displaying said retrieved background image on said display; and
means for downloading background image data from a source on the Internet, wherein
said background image comprises colors available by the display except colors used for foreground information,
colors of lighter shade including white respectively transparent form elements of the background image, and
colors with a high saturation are used for the foreground information.

12. A mobile telephone for providing a background image on its display according to claim 11, wherein said selecting means selects said background image according to pre-set parameters.

13. A mobile telephone for providing a background image on its display according to claim 11, wherein said selecting means selects said background image based on information read from the International Mobile Subscriber Identification.

14. A mobile telephone for providing a background image on its display according to claim 11, wherein said selecting means selects said background image based on information received from a base station.

15. A mobile telephone for providing a background image on its display according to claim 11, wherein the means for downloading background image data from a source on the Internet enable a user of the mobile telephone to download said background image data from the source on the Internet.

16. A mobile telephone for providing a background image on its display according to claim 11, wherein said retrieving means reads said background image data from a memory on a Subscriber Identity Module.

17. A mobile telephone for providing a background image on its display according to claim 11, wherein said retrieving means reads said background image data from a memory of the mobile telephone unit.

18. A mobile telephone for providing a background image on its display according to claim 11, wherein said retrieving means reads said background image data from an external memory attached to said mobile telephone.

19. A mobile telephone for providing a background image on its display according to claim 11, wherein said means for downloading a source from the Internet is a browser means comprising a browser functionality for downloading said background image data from said source on the Internet.

20. A mobile telephone for a wireless telecommunication system, comprising a controller configured to provide a background image on a display, whereby the data of one or more of said background images are stored in at least one memory accessible for said mobile telephone, said mobile telephone comprising:
the controller configured to automatically select said background image to be displayed based on a pre-set parameter that identifies said at least one memory accessible for said mobile phone at which said automatically selected background image is stored, retrieve the data of said automatically selected background image from said at least one memory identified by said pre-set parameter when said automatically selected background image is available from said at least one memory identified by said pre-set parameter, and retrieve data of a substitute background image defined based on the stored pre-set parameter when said automatically selected background image is not available from said at least one memory identified by said pre-set parameter;
a display configured to display said retrieved background image; and
a communication interface configured to download background image data from a source on the Internet, wherein
said background image comprises colors available by the display except colors used for foreground information,
colors of lighter shade including white respectively transparent form elements of the background image, and
colors with a high saturation are used for the foreground information.

* * * * *